US012783877B2

(12) United States Patent
Vierck et al.

(10) Patent No.: US 12,783,877 B2
(45) Date of Patent: Nov. 3, 2026

(54) ARTIFICIAL NEURAL NETWORK FOR SPARSE DATA PROCESSING

(71) Applicant: MERLN, LLC, Irving, TX (US)

(72) Inventors: Ben Vierck, Ballwin, MO (US); Jeremy Slater, Friendswood, TX (US); Justin Hofer, O'Fallon, MO (US)

(73) Assignee: MERLN, LLC, Irving, TX (US)

( * ) Notice: Subject to any disclaimer, the term of this patent is extended or adjusted under 35 U.S.C. 154(b) by 951 days.

(21) Appl. No.: 18/015,874

(22) PCT Filed: Jul. 14, 2021

(86) PCT No.: PCT/US2021/041667
§ 371 (c)(1),
(2) Date: Jan. 12, 2023

(87) PCT Pub. No.: WO2022/015874
PCT Pub. Date: Jan. 20, 2022

(65) Prior Publication Data

US 2023/0316072 A1 Oct. 5, 2023

Related U.S. Application Data

(60) Provisional application No. 63/053,245, filed on Jul. 17, 2020.

(51) Int. Cl.
*G06N 3/08* (2023.01)
*G06N 3/044* (2023.01)
*G06N 3/10* (2006.01)

(52) U.S. Cl.
CPC ............... *G06N 3/08* (2013.01); *G06N 3/044* (2023.01); *G06N 3/10* (2013.01)

(58) Field of Classification Search
CPC ............ G06N 3/08; G06N 3/044; G06N 3/10; G06N 3/0442; G06N 3/0464; G06N 3/047; G06N 3/09; G06N 3/084
See application file for complete search history.

(56) References Cited

U.S. PATENT DOCUMENTS

2011/0081053 A1* 4/2011 Zheng ................. G06F 18/2136
382/118
2019/0303713 A1* 10/2019 Kumar ................... G06V 10/82
(Continued)

FOREIGN PATENT DOCUMENTS

WO WO-2014083429 A2 * 6/2014 ......... G06Q 30/0643

OTHER PUBLICATIONS

Z. Jiang, X. Shen, H. Wang and Z. Ding, "Joint PSK Data Detection and Channel Estimation Under Frequency Selective Sparse Multipath Channels," in IEEE Transactions on Communications, vol. 68, No. 5, pp. 2726-2739, May 2020, doi: 10.1109/TCOMM.2020.2975172. (Year: 2020).*

(Continued)

*Primary Examiner* — Cesar B Paula
*Assistant Examiner* — Harrison C Kim
(74) *Attorney, Agent, or Firm* — Dentons US LLP

(57) ABSTRACT

This disclosure enables various computing technologies for various data science techniques for ameliorating negative impacts of signals that are sparse in various data series for trainings of ANN models. These data science techniques can be helpful for dealing with time series or non-fixed-length time spans or other forms of discretized, parsed, or tokenized data. Some of the data science techniques can enable a process that ameliorates a negative impact of a sparse signal on a learning performance of an ANN model. This amelioration can occur by adjusting an impact of a computed loss on a learning process of an ANN on a sample-by-sample basis in such a way as to reflect a probability that the ANN model has seen a signal for that sample.

20 Claims, 18 Drawing Sheets

(56) References Cited

U.S. PATENT DOCUMENTS

| | | | | |
|---|---|---|---|---|
| 2019/0385748 | A1* | 12/2019 | Thomas | G06N 3/08 |
| 2020/0093455 | A1* | 3/2020 | Wang | G16H 50/70 |
| 2020/0126192 | A1* | 4/2020 | Munkberg | G06N 3/0464 |
| 2021/0073675 | A1* | 3/2021 | Ribera Prat | G06F 17/18 |
| 2021/0350272 | A1* | 11/2021 | Miroshnikov | G06N 20/20 |

OTHER PUBLICATIONS

International Search Report and Written Opinion dated Oct. 29, 2021 in related International Application PCT/US2021/041667 filed Jul. 14, 2021 (12 pages).
Li, et al., VS-GRU: A Variable Sensitive Gated Recurrent Neural Network for Multivariate Time Series with Massive Missing Values, Applied Sciences, vol. 9, 2019 (18 pages).
Pham et al., DeepCare: A Deep Dynamic Memory Model for Predictive Medicine, 20th Pacific-Asia Conference, 2017 (27 pages).

* cited by examiner

| | Batch 1 | | | Batch 2 | | | Batch 3 | | | Batch 4 | | | Batch 5 | | |
|---|---|---|---|---|---|---|---|---|---|---|---|---|---|---|---|
| Sample A | 0.2 | 0.2 | 0.2 | 0.4 | 0.4 | 0.4 | 0.6 | 0.6 | 0.6 | 0.8 | 0.8 | 0.8 | 1.0 | 1.0 | 1.0 |
| Sample B | 0.2 | 0.2 | 0.2 | 0.4 | 0.4 | 0.4 | 0.6 | 0.6 | 0.6 | 0.8 | 0.8 | 0.8 | 1.0 | 1.0 | 1.0 |
| Sample C | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Sample D | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Sample E | 0.2 | 0.2 | 0.2 | 0.4 | 0.4 | 0.4 | 0.6 | 0.6 | 0.6 | 0.8 | 0.8 | 0.8 | 1.0 | 1.0 | 1.0 |

FIG. 16

| | | Loss | | Sample Weight | | Final Loss |
|---|---|---|---|---|---|---|
| Sample A | ⇨ | 0.1 | x | 1 | = | 0.1 |
| Sample B | ⇨ | 0.2 | x | 2 | = | 0.4 |
| Sample C | ⇨ | 0.4 | x | 0.5 | = | 0.2 |
| Sample D | ⇨ | 0.2 | x | 1 | = | 0.2 |
| Sample E | ⇨ | 0.4 | x | 0 | = | 0 |

FIG. 18

ARTIFICIAL NEURAL NETWORK FOR SPARSE DATA PROCESSING

CROSS-REFERENCE TO RELATED PATENT APPLICATION

This patent application claims a benefit of priority to PCT International Application PCT/US2021/041667 filed 14 Jul. 2021; which claims a benefit of priority to U.S. Provisional Patent Application 63/053,245 filed 17 Jul. 2020, each of which is incorporated by reference herein for all purposes.

TECHNICAL FIELD

This disclosure relates to various data science techniques for ameliorating negative impacts of signals that are sparse in various data series for trainings of artificial neural network models.

BACKGROUND

A recurrent neural network (RNN) is a type of an artificial neural network (ANN). The RNN (e.g., a stateful RNN) has a plurality of nodes and a plurality of logical connections between the nodes such that the logical connections form a directed graph along a temporal sequence in order to exhibit a temporal dynamic behavior. This configuration allows each of the nodes to have an internal state (e.g., a memory) that can be used to process various sequences of inputs. When training the RNN, various conventional data science techniques can be used. However, these techniques are technologically deficient in their abilities to learn to detect signals in data when the signals within that data have high levels of sparsity.

In particular, a signal can refer to a discernible feature in a data sample, where the discernible feature indicates that the data sample belongs to a particular class. For example, when programming a neural net classifier to discriminate between various videos that contain cats and those that do not, a frame of a video that depicts a feature of a part of a cat can be said to contain a signal within the frame. Correspondingly, a frame of the video that does not depict any features of any parts of the cat can be said not to contain the signal.

FIG. 1 illustrates a data series (e.g., a time series) depicted as a grid (e.g., a data structure, an array) having a plurality of cells formed by a plurality of rows and a plurality of columns that logically intersect each other. Each of the rows illustrates a sequence by a data sample (e.g., a text sentence with a set of words, a set of voltage readings over a time period, a set of financial security prices over a time period, a set of frames within a video). Each of the columns illustrates a distinct unit of partitioning or parsing the data sample (e.g., a data token, a unit of time). The cells are populated with a plurality of data values (e.g., a word, a voltage reading for a moment in time, a point-in-time price of a financial security, a frame within a video) corresponding to a plurality of signals (represented as individual red filled circles). In contrast, the cells that do not contain the signals are illustrated by a plurality of empty circles (represented as individual white filled circles), whether those cells contain or do not contain any data values. Therefore, the data series shows a uniform distribution of the signals within the data samples. As such, an acceptable version of a dataset for the RNN can be one in which the signal is uniformly distributed within the data samples, as illustrated via the grid. Correspondingly, the data samples A, B, and E represent those data samples within the data series that belong to a class for which the RNN is being trained to discriminate for. For example, the acceptable version of the dataset for the RNN can include a collection of 10 (or less or more) seconds of electroencephalography (EEG) data, with some of the samples containing data indicating a presence of seizures and some of the samples containing data indicating an absence of seizures. Therefore, the RNN can process some, many, most or all of these samples of data in a batch format and be trained to discriminate between these two event classes (presence seizures versus absence of seizures).

FIG. 2 illustrates the data series being grouped according to a window size. In particular, the RNN can take as input a fixed number of the data samples. For example, the RNN that operates on a video may take as input exactly three frames at a time. That fixed input size is determined by an author of the RNN and is known as the window size. As such, FIG. 2 illustrates the data series being grouped according to the window size of three.

FIG. 3 illustrates the data series being segmented into a plurality of batches based on the window size. In particular, a form of batch processing can be used when deploying the RNN in order to segment the data samples into the batches. As such, for simplicity purposes, the batch size is identical to a total number of data samples such that each of the data samples appears in each of the batches (although this can vary). Resultantly, the signals are uniformly distributed throughout the data samples, where each data window (based on the window size) of the three data samples (A, B, E) that belong to a target class contain the signals in each of the batches. Therefore, the RNN should be able to discriminate between various target classes due to an abundant distribution of the signals.

FIG. 4 illustrates the data series where the signals are densely distributed. In particular, the signals are densely distributed throughout the data series and each of the data windows (based on the window size) of the three data samples (A, B, E) that belong to the target class contain the signals in each of the batches. Therefore, the RNN should be able to discriminate between various target classes due to an abundant distribution of the signals.

There are several technological problems that can arise when the signals are sparse. For example, the RNN may not be able to discriminate between various target classes due to a sparse distribution of the signals. Specifically, FIG. 5 illustrates that in each of the data samples belonging to the target class, as shown in the batches 1, 2, 5, there is just one data point that contains the signal within each of those respective data samples. FIG. 6 illustrates that the batches 3, 4 do not contain any of the signals, yet the RNN is instructed when the RNN is trained that the three data samples (A, B, E) that belong to the target class contain the signals in each of the batches. Additionally, the data sample B complicates how the RNN learns because at a point in time when the RNN is computing a loss for the batch 1 of the data sample B, the RNN has not seen any of the signals yet for the data sample B. In fact, the RNN will only see the signal when the batch 5 is reached (last batch). Yet, as far as the RNN is concerned, the data series reads as if the data series contained the signals distributed as shown in FIG. 7. Therefore, for the data sample B, in the batches 1 through 4, the RNN is learning from mislabeled data. This modality of learning leads to a poor learning performance or an inability to learn at all.

SUMMARY

Broadly, this disclosure enables various computing technologies for various data science techniques for ameliorating negative impacts of signals that are sparse in various data series for trainings of ANN models. These data science techniques can address various technological concerns, as explained above, and can be helpful for dealing with time series or non-fixed-length time spans or other forms of discretized, parsed, or tokenized data. Some of the data science techniques can enable a process that ameliorates a negative impact of a sparse signal on a learning performance of an ANN model. This amelioration can occur by adjusting an impact of a computed loss on a learning process of an ANN on a sample-by-sample basis in such a way as to reflect a probability that the ANN model has seen a signal for that sample.

An embodiment can include a method for ameliorating negative impacts of signals that are sparse in various data series for trainings of artificial neural network models, the method comprising: accessing, by a processor, a window size, a loss function, a plurality of sample weights, and a data series, wherein the loss function has a first value and a second value, wherein the data series contains a plurality of data samples containing a plurality of signals, wherein the signals are sparse within the data samples; segmenting, by the processor, the data samples into a plurality of batches according to the window size; for each of the batches: causing, by the processor, a model of an ANN to output a prediction value based on the first value given a window of data based on the second value, wherein the window data corresponding to the window size; inputting, by the processor, the window of data and the prediction value into the loss function such that the loss function outputs a plurality of computed loss values for each of the data samples for a respective window of data when the ANN has a first state including a set of weights; determining, by the processor, a probability value for each of the data samples within a respective batch while accounting a total duration of a respective data sample, a cumulative amount of data in the respective sample that has already been processed by the model, and an average frequency of a respective signal per the respective data sample; generating, by the processor, a plurality of new sample weights based on applying the probability values to the sample weights for the respective batch; generating, by the processor, a new set of computed loss values based on the computed loss values and the new sample weights; applying, by the processor, the new set of computed loss values to the set of weights such the set of weights is changed from the first state into a second state; and causing, by the processor, the ANN to be programmed for generating a prediction that is more accurate at the second state than the first state.

An embodiment can include a system for ameliorating negative impacts of signals that are sparse in various data series for trainings of artificial neural network models, the system comprising: a server programmed to: access a window size, a loss function, a plurality of sample weights, and a data series, wherein the loss function has a first value and a second value, wherein the data series contains a plurality of data samples containing a plurality of signals, wherein the signals are sparse within the data samples; segment the data samples into a plurality of batches according to the window size; for each of the batches: cause a model of an ANN to output a prediction value based on the first value given a window of data based on the second value, wherein the window data corresponding to the window size; input the window of data and the prediction value into the loss function such that the loss function outputs a plurality of computed loss values for each of the data samples for a respective window of data when the ANN has a first state including a set of weights; determine a probability value for each of the data samples within a respective batch while accounting a total duration of a respective data sample, a cumulative amount of data in the respective sample that has already been processed by the model, and an average frequency of a respective signal per the respective data sample; generate a plurality of new sample weights based on applying the probability values to the sample weights for the respective batch; generate a new set of computed loss values based on the computed loss values and the new sample weights; apply the new set of computed loss values to the set of weights such the set of weights is changed from the first state into a second state; and cause the ANN to be programmed for generating a prediction that is more accurate at the second state than the first state.

DESCRIPTION OF DRAWINGS

FIGS. 9-18 illustrate various embodiments of various computational techniques for ameliorating a negative impact of a signals is sparse in a data series for training of a model of an ANN according to this disclosure.

DETAILED DESCRIPTION

Figure 1:
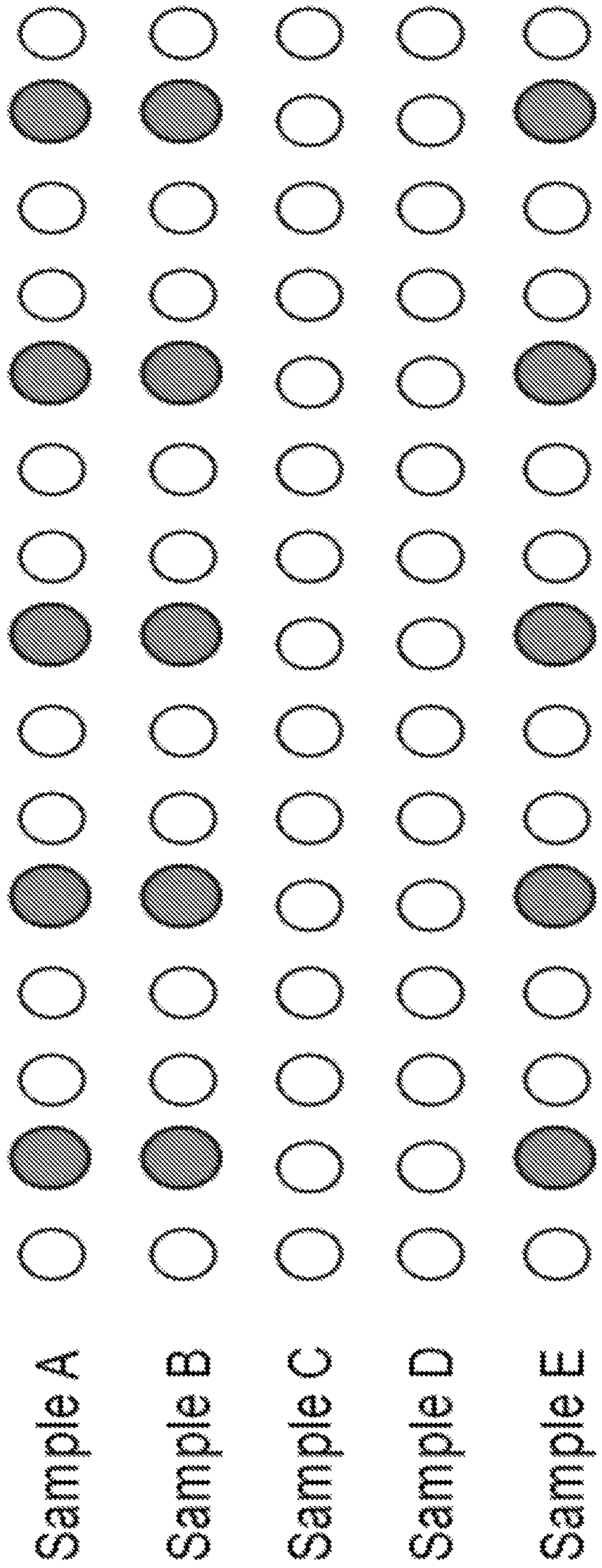
FIGS. 1-7 illustrate various diagrams of data series according to this disclosure.
Figure 2:
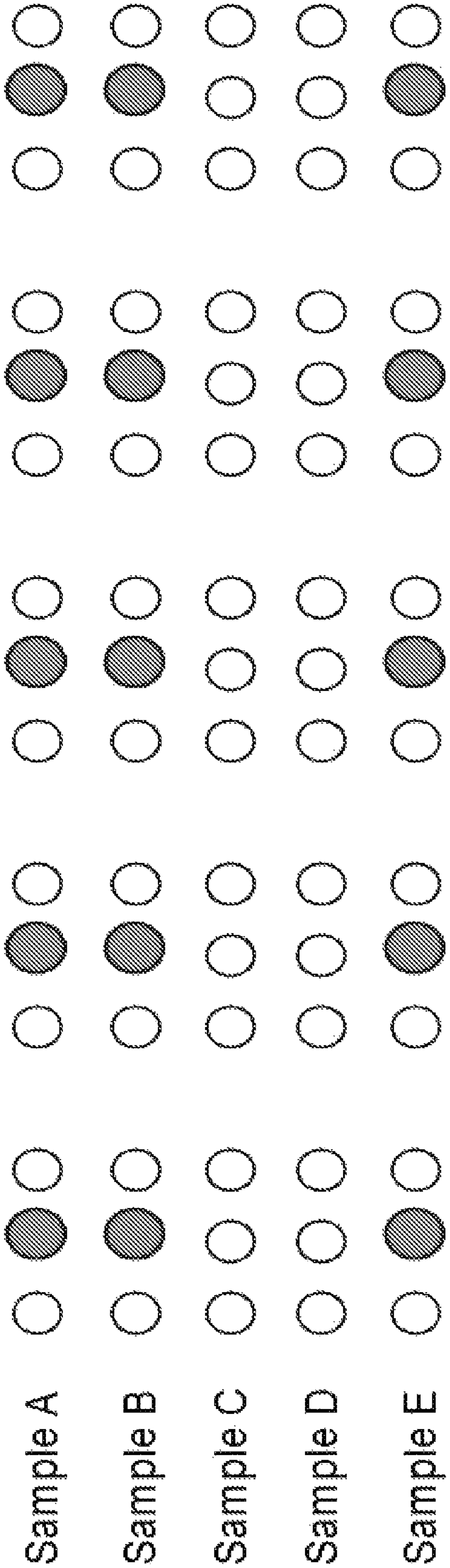
Figure 3:
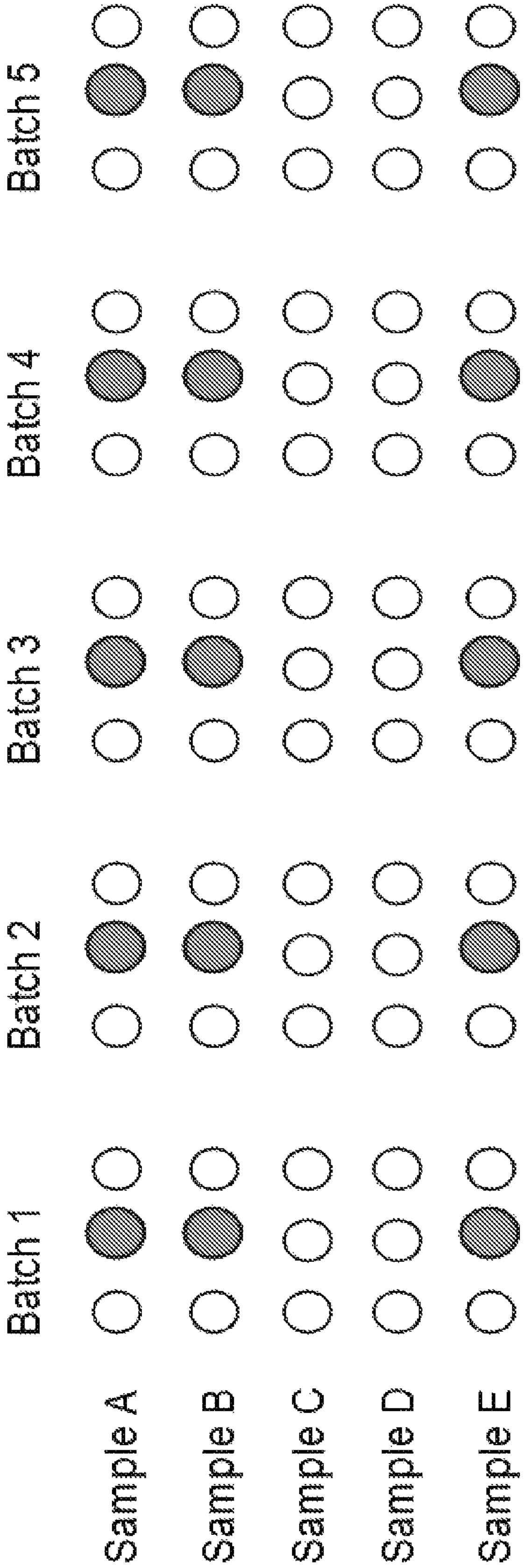
Figure 4:
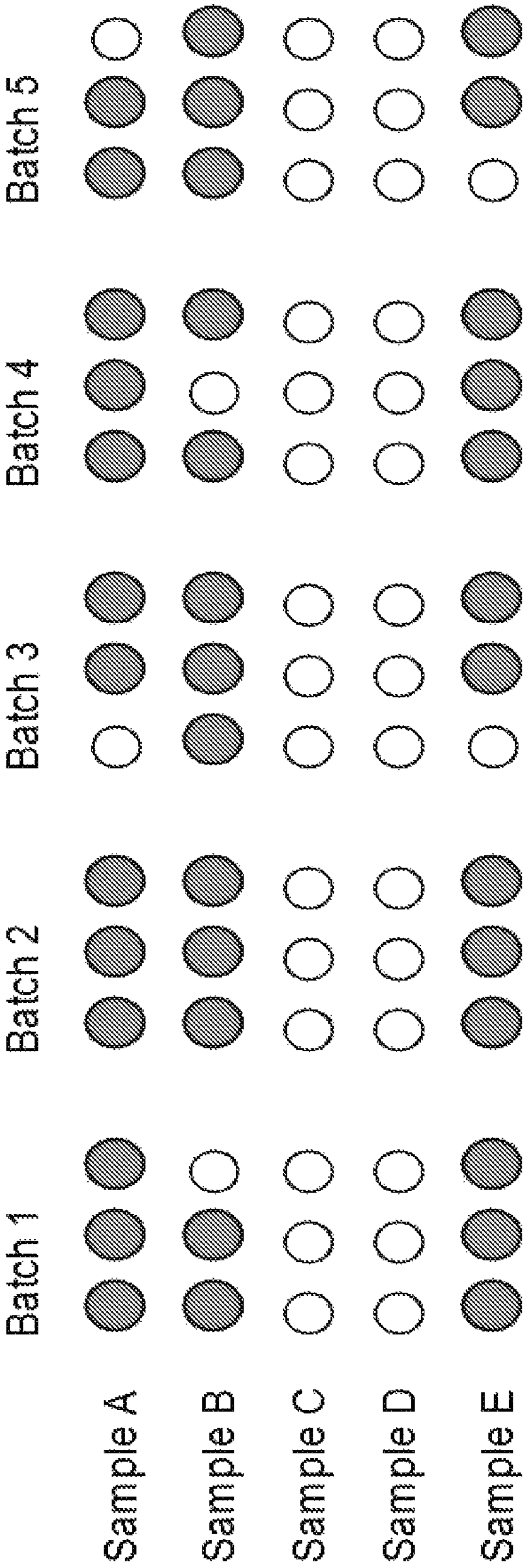
Figure 5:
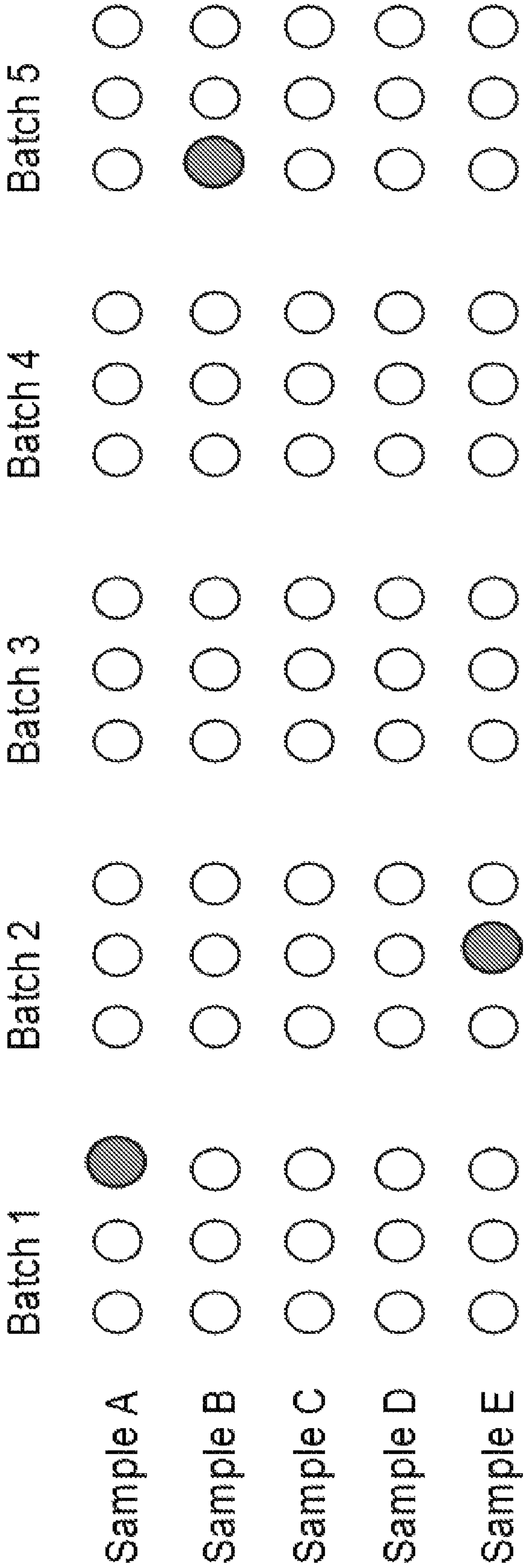
Figure 6:
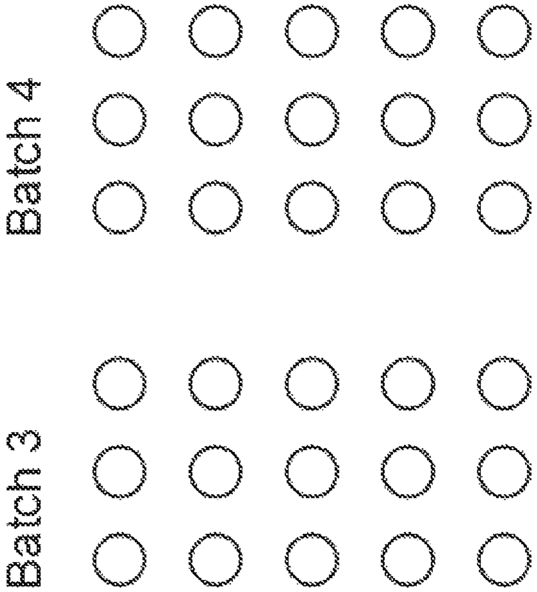
Figure 7:
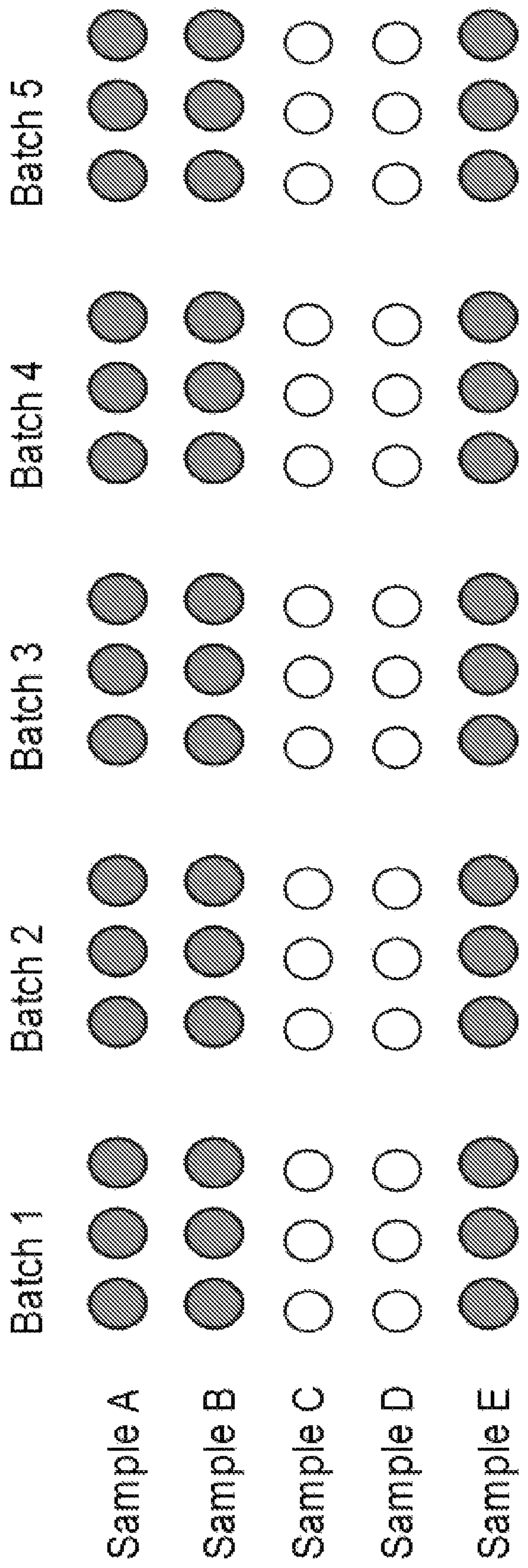

Broadly, this disclosure enables various computing technologies for various data science techniques for ameliorating negative impacts of signals that are sparse in various data series for trainings of ANN models. These data science techniques can address various technological concerns, as explained above, and can be helpful for dealing with time series or non-fixed-length time spans or other forms of discretized, parsed, or tokenized data. Some of the data science techniques can enable a process that ameliorates a negative impact of a sparse signal on a learning performance of an ANN model. This amelioration can occur by adjusting an impact of a computed loss on a learning process of an ANN on a sample-by-sample basis in such a way as to reflect a probability that the ANN model has seen a signal for that sample.

This disclosure is now described more fully with reference to FIGS. 1-18, in which various embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein. For example, "one or more" includes one, two, three, four, five, six, seven, eight, nine, ten, tens, hundreds, thousands, or more including all intermediary whole or decimal values therebetween.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were copied and pasted herein or specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Figure 8:
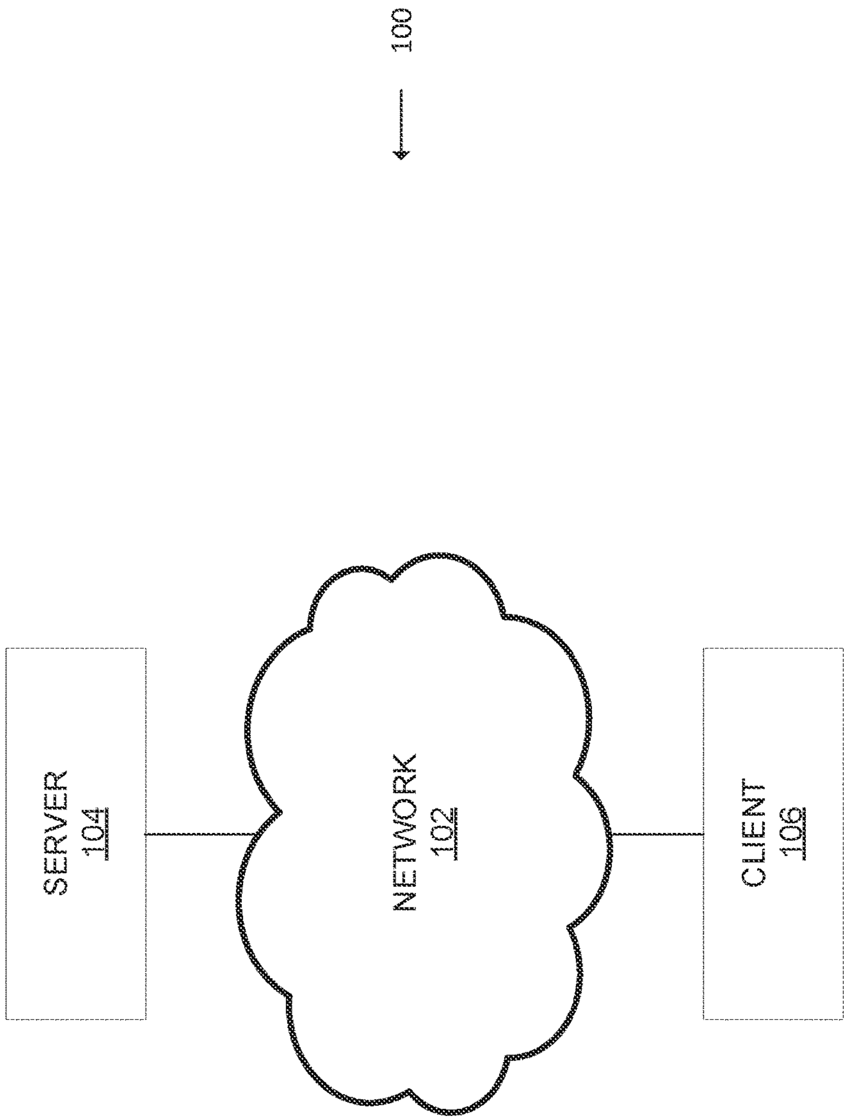
FIG. 8 illustrates a diagram of an embodiment of a system for ameliorating a negative impact of a signal that is sparse in a data series for training a model in an ANN according to this disclosure.

FIG. 8 is a diagram of an embodiment of a system for ameliorating a negative impact of a signal that is sparse in a data series for training a model in an ANN according to this disclosure. In particular, a system 100 includes a network 102, a server 104, and a client 106. The server 104 and the client 106 are in communication (e.g., wired, wireless, waveguide) with each other over the network 102.

The network 102 includes a plurality of computing nodes interconnected via a plurality of communication channels, which allow for sharing of resources, applications, services, files, streams, records, information, or others. The network 102 can operate via a network protocol, such as an Ethernet protocol, a Transmission Control Protocol (TCP)/Internet Protocol (IP), or others. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network 102 can include an intranet, an extranet, or others. The network 102 can include Internet. The network 102 can include other networks or allow for communication with other networks, whether sub-networks or distinct networks.

The server 104 can include a web server, an application server, a database server, a virtual server, a physical server, or others. For example, the server 104 can be included within a computing platform (e.g., Amazon Web Services, Microsoft Azure, Google Cloud, IBM cloud) having a cloud computing environment defined via a plurality of servers including the server 104, where the servers operate in concert, such as via a cluster of servers, a grid of servers, a group of servers, or others, to perform a computing task, such as reading data, writing data, deleting data, collecting data, sorting data, or others. For example, the server 104 or the servers including the server 104 can be configured for parallel processing (e.g., multicore processors, multithreading). The computing platform can include a mainframe, a supercomputer, or others. The servers can be housed in a data center, a server farm or others. The computing platform can provide a plurality of computing services on-demand, such as an infrastructure as a service (IaaS), a platform as a service (PaaS), a packaged software as a service (SaaS), or others. For example, the computing platform can providing computing services from a plurality of data centers spread across a plurality of availability zones (AZs) in various global regions, where an AZ is a location that contains a plurality of data centers, while a region is a collection of AZs in a geographic proximity connected by a low-latency network link. For example, the computing platform can enable a launch of a plurality of virtual machines (VMs) and replicate data in different AZs to achieve a highly reliable infrastructure that is resistant to failures of individual servers or an entire data center.

The client 106 includes a logic that is in communication with the server 104 over the network 102. When the logic is hardware-based, then the client 106 can include a desktop, a laptop, a tablet, or others. For example, when the logic is hardware-based, then the client can include an input device, such as a cursor device, a hardware or virtual keyboard, or others. Likewise, when the logic is hardware-based, then the client 106 can include an output device, such as a display, a speaker, or others. Note that the input device and the output device can be embodied in one unit (e.g., touchscreen). When the logic is software-based, then the client 106 can include a software application, a browser, a software module, an executable or data file, a mobile app, or others. Regardless of how the logic is implemented, the logic enables the client 106 to communicate with the server 104, such as to request or to receive a resource/service from the computing platform via a common framework, such as a hypertext transfer protocol (HTTP), a HTTP secure (HTTPS) protocol, a file transfer protocol (FTP), or others.

FIGS. 9-18 illustrate various embodiments of various computational techniques for ameliorating a negative impact of a signal that is sparse in a data series for training of a model of an ANN according to this disclosure. In particular, these data science techniques are performed by the server 104 as being requested or instructed over the network 102 by a user (e.g., data scientist) operating the client 106. The data science techniques can address various technological concerns, as explained above, and can be helpful for dealing with time series or non-fixed-length time spans or other forms of discretized, parsed, or tokenized data. Some of the data science techniques can enable a technological methodology that ameliorates a negative impact of a sparse signal on a learning performance of an ANN model. This amelioration can occur by adjusting an impact of a computed loss on a learning process of an ANN on a sample-by-sample basis in such a way as to reflect a probability that the ANN model has seen a signal for that sample. Note that although this disclosure is described in context of the RNN, which can be stateful, other types or sub-types of the ANN can be used, whether stateful or non-stateful. Some of such types or sub-types can include a long short-term memory (LSTM), a convolutional neural network (CNN), a convolutional LSTM, a gated recurrent unit (GRU), or others, any of which can be stateful or non-stateful.

Constructing a batch involves having various individual values of data (represented as individual circles of color) belonging to each data sample (represented as rows) being read by various machine learning models in batches in order to maximize at least some utilization of a processing hardware device via computational parallelized processing (e.g., on a core basis, on a thread basis). For example, the processing hardware device can include a central processing unit (CPU), a graphics processing unit (GPU), a tensor processing unit (TPU), or others, which can be configured for parallel processing (e.g., on a core basis, on a thread basis). For example, at least some device parallelization (e.g., spreading or distributing a model architecture across various physical devices) or at least some data parallelization (e.g., splitting or distributing data across various physical devices) can be applicable. For example, at least some device parallelization or at least some data parallelization can include processing (e.g., reading, modifying, moving, sorting, organizing) of each data sample in a batch, a data column, or a dataset in parallel simultaneously by multiple cores of the processing hardware device (e.g., CPU, GPU, TPU).

A batch includes an organizational unit of data or a dataset illustrated as a grid of a plurality of cells defined via a plurality of rows and a plurality of columns that logically intersect each other (e.g., a data structure, an array). For example, the batch can be accessed (e.g., being granted access, read, modified, opened, retrieved, fed, inserted) for subsequent processing. The rows illustrate a plurality of data samples. The columns can be any number, as set by the user of the client 106. The cells are populated with a plurality of data values (e.g., a text string, a word, a voltage reading for a moment in time, a point-in-time price of a financial security, a frame within a video) corresponding to a plurality of signals (represented as individual red filled circles). In contrast, the cells that do not contain the signals are illustrated by a plurality of empty circles (represented as individual white filled circles), whether those cells contain or do not contain any data values. The data values can correspond to a word, a single voltage reading for a moment in time, a single point-in-time price of a financial security, a weather forecast, an exchange rate, a set of sales values, a set of sound wave values, or other data. For example, the data samples can contain the data values that are collected over time from a plurality of electrical leads (e.g., EEG leads) attached to a plurality of people or a plurality of thermometers measuring a plurality of environments or people or a plurality of data channels of an electrical signal. For example, the data values can be a plurality of temperature readings obtained from a plurality of indoor or outdoor environments or people. Note that data can include alphanumeric data, pixel data, or other data types.

The batch can be constructed while using various parameters. Some of such parameters include a window size and a batch size, which can be values specified by the user of the client 106. The window size can be any positive whole number greater than zero (e.g., six, thirteen, three hundred). The window size is a number of individual sequential data values that the RNN expects to receive as input. For example, if the RNN is being designed to predict temperature, then, by design, the RNN may, as designed, mandate that previous ten temperature readings be provided as input to the model of the RNN. For simplicity, the window size is set to three, but can be any positive whole number greater than zero. The batch size can be any positive whole number greater than zero (e.g., seven, sixteen, nine hundred). The batch size is a number of samples of data to be included in each batch. A theoretical maximum batch size is a maximum number of data points in a sample, but in practice is limited by an amount of memory on the processing hardware device. For simplicity, the batch size is set to three, but can be any positive whole number greater than zero.

As shown in FIGS. 1-7, the batch can be constructed by segmenting the data samples into a set of data columns (or windows) of three values each (window size) and five data samples each (batch size). This action retains a sequential order in which that data was provided. As such, a set of 3×5 data columns (batches) is formed. The set of data columns now includes 5 data columns (batches).

For the RNN having the model, a loss is a value indicating how bad the model's prediction was on a single example. If the model's prediction is as desired or correct, then the loss is zero, otherwise, the loss is greater than zero. As such, when training the model, the user (e.g., data scientist) attempts to find a set of weights and biases that have a low loss, on average, across some, many, most, or all of the data samples. Resultantly, a computed loss value is an output of a loss function, which is provided by the user (e.g., data scientist) of the RNN. The computed loss value is used by a training algorithm to make various adjustments to the set of weights in the RNN in order to minimize future loss.

Figure 9:
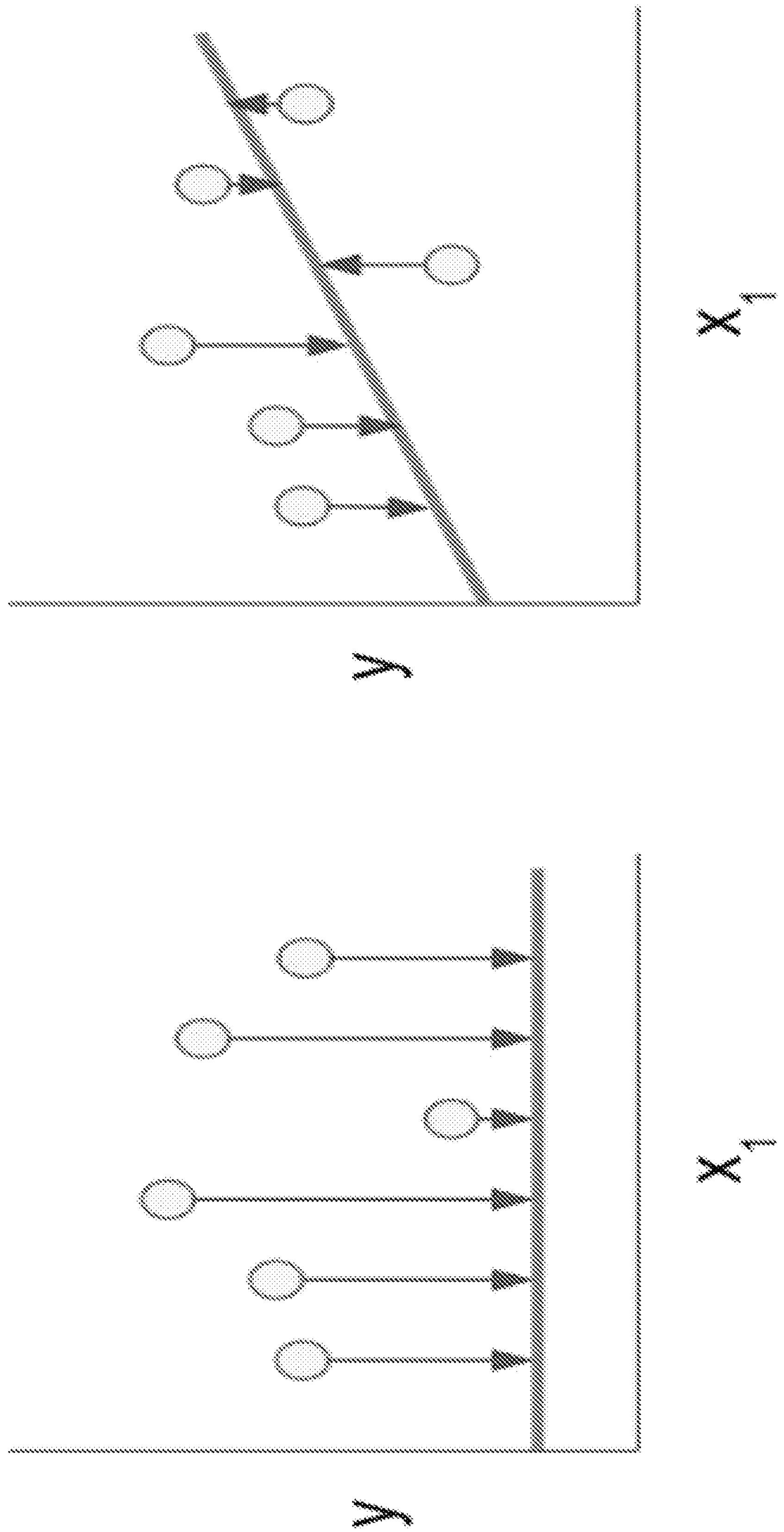

FIG. 9 illustrates various diagrams (left and right) for various model predictions according to this disclosure. In particular, the diagrams depict various circles (gray filled) that represent various ground truth points for the RNN. Likewise, the diagrams depict a blue line that represents various model predictions for the RNN. Similarly, the diagrams depict various arrows between the ground truth points and the blue line (the model predictions) measuring to various corresponding loss values (based on distance). In-between the left diagram (with horizontal blue line) and the right diagram (with inclined blue line), the training algorithm has made adjustments to various internal values of the model (e.g., parameters, hyperparameters, node weights) so that various future predictions will have a better fit to the ground truth points based on a spatial proximity to the blue line. For example, less distance between the ground truth points and the blue line indicates more accuracy of the model's predictions. Accordingly, the diagrams of FIG. 9 depict an effective prediction rate of a model before and after an application of loss to a plurality of weights of the model. Note that FIG. 9 shows a first value (x) and a second value (y), where the first value an input to the model and the second value is an output from the model.

Figure 10:
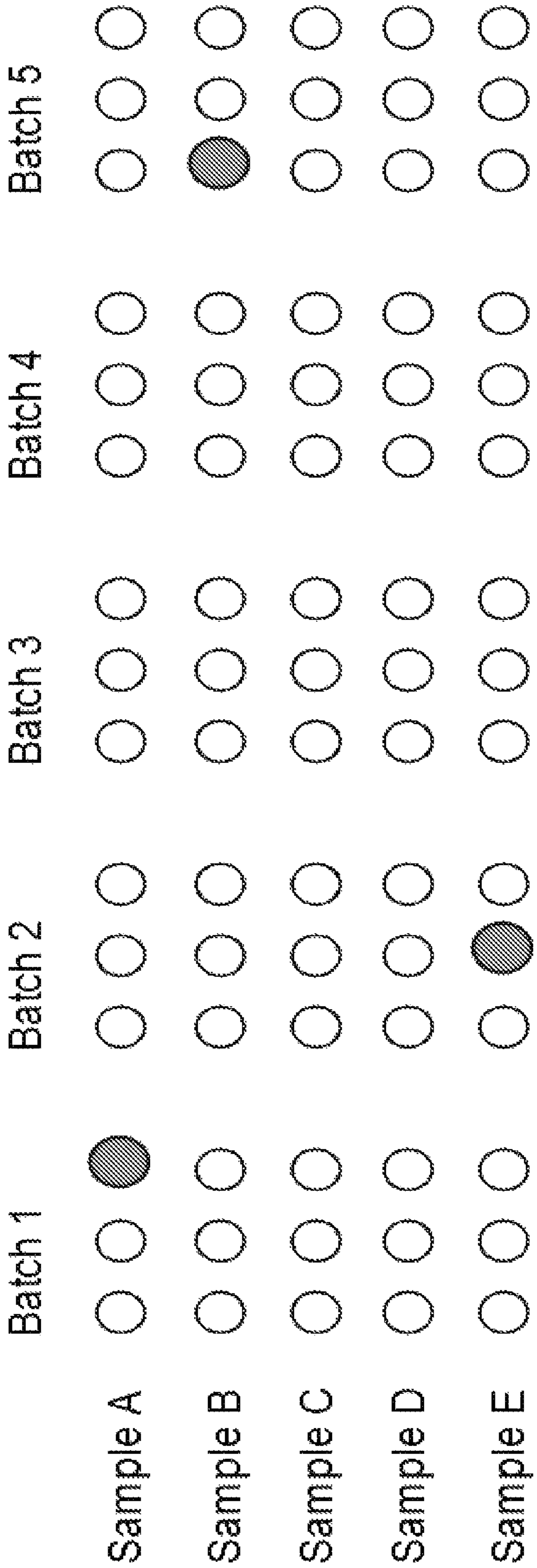

FIG. 10 illustrates the data series having the signals that are sparse according to this disclosure. In particular, for simplicity, the RNN can be a classifier for discriminating between various videos that contain cats and those that do not (although the RNN can be a classifier or a non-classifier for discriminating or not discriminating between any forms content or signals). As such, a frame of a video that depicts a feature of a part of a cat can be said to contain a signal within the frame. Correspondingly, a frame of the video that does not depict any features of any parts of the cat can be said not to contain the signal. As shown in FIG. 10, the data samples A, B, E are the frames of the videos that depict a feature of a part of a cat and the data samples C, D do not.

Figure 11:
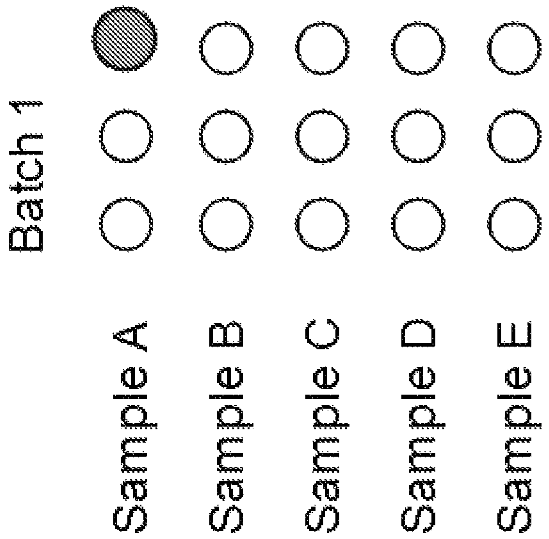

When the batch 1 is considered on its own, as illustrated in FIG. 11, even though the data samples B, E later contain the frames depicting a feature of a part of a cat, at this point in the data sequence for the data samples B, E, the RNN has not seen any frames with a cat imagery (e.g., a feature of a part of a cat). As such, when the loss is calculated during this batch, if the RNN does not predict that the data samples B, E contain the cat imagery, then the computed loss value for those data samples B, E will be relatively high and the RNN will make adjustments to the set of weights of the RNN so that given an identical set of conditions the RNN will be more likely to predict that the data samples B, E do contain the cat imagery. Those loss values were not informed based on the ground truth points. Those adjustments to the set of weights did not contribute in a positive way to the efficacy of the model of the RNN. In fact, those adjustments are more likely to have a negative effect on a learning process for the model.

Figure 12:
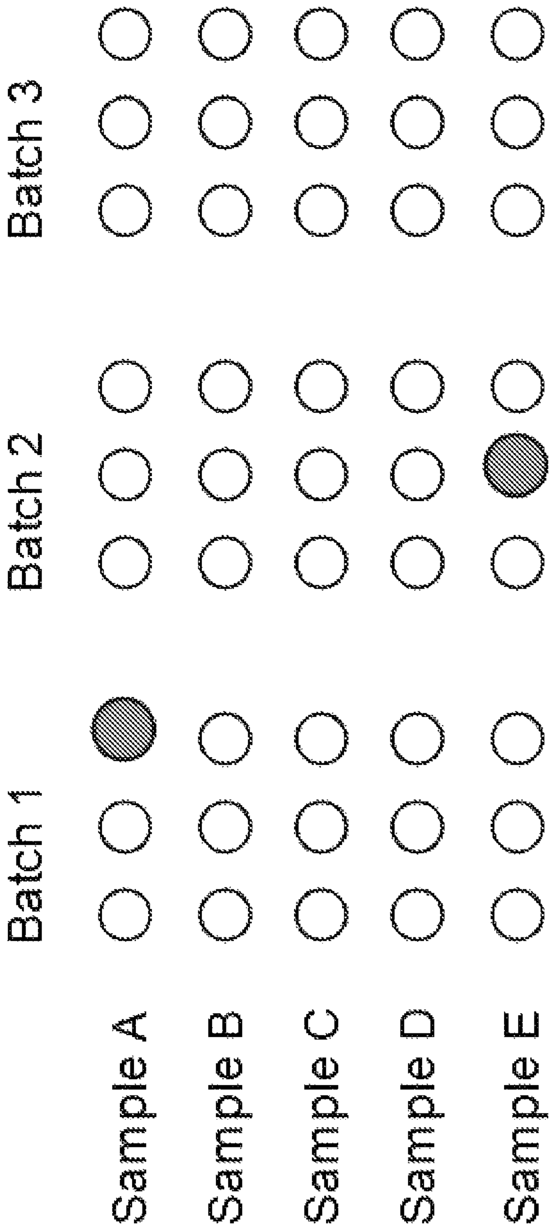

As shown in FIG. 12, with the RNN (or any stateful ANNs), a set of cumulative data for the RNN has an effect on the computed loss for some, many, most or all given batches, and sometimes, not just some data contained within that batch. This time when the loss is computed, both of the data samples A, E contain at least a frame of the video that contains the cat imagery. However, the data sample B, though, has not at this time. As in illustrated in FIG. 11, the loss value for the data sample B is not informed by the ground truth points. Those adjustments are likely to have a negative impact on the learning process for the model.

Figure 13:
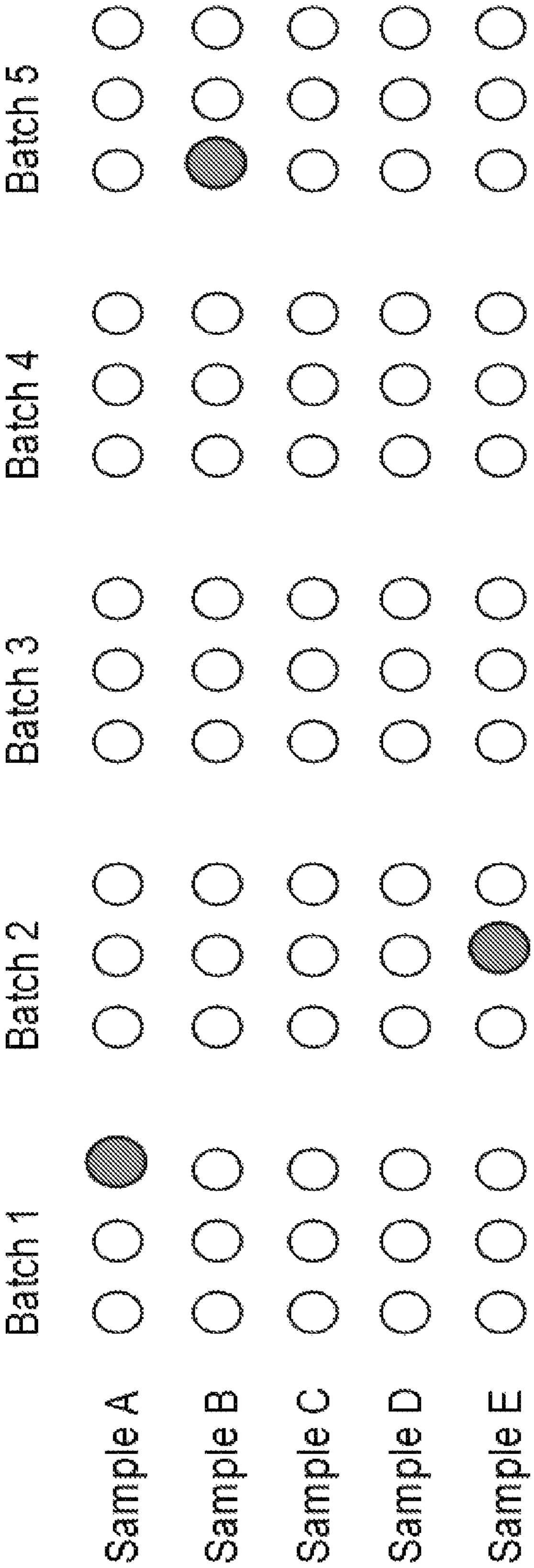
Figure 14:
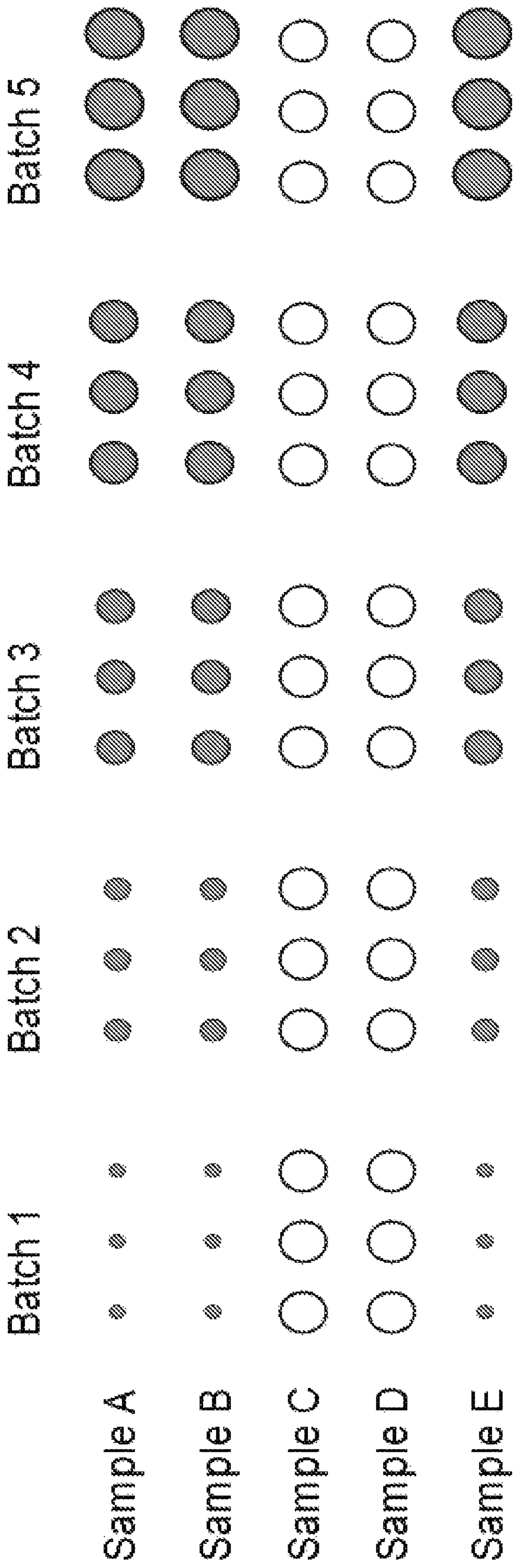
Figure 15:
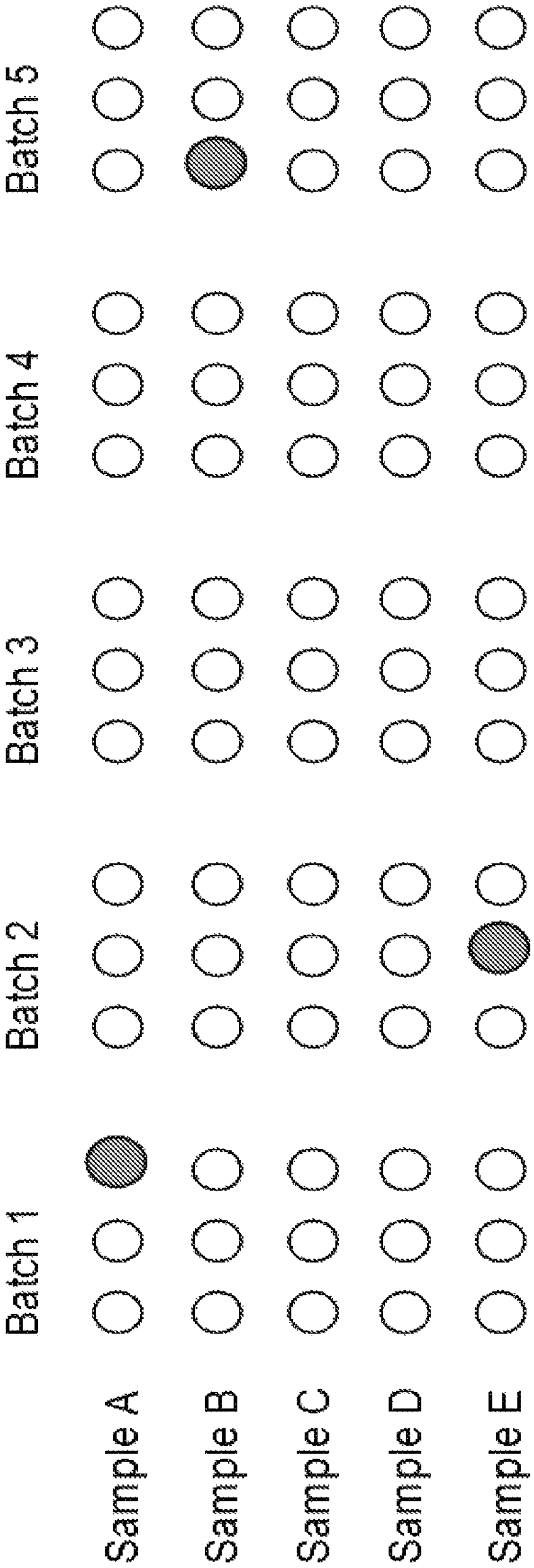

As shown in FIG. 13, some, most, or all loss computation for all three data samples (A, B, E) that contain the cat imagery have at least some benefit of having seen some of the signals. These loss values have all been informed by the ground truth points. Those adjustments to the set of weights are all likely to have a positive effect on the learning for the model. Therefore, if moving sequentially through a data series or a sequence of data with a sparse signal (e.g., data samples A, B, E), then some, many, most, or all computed losses computed earlier have a lower probability of having been impacted by a true signal and contributing positively to the learning process for the model. However, some, many, most, or all losses computed later in the sequence of data with the sparse signal have a higher probability of having been impacted by the true signal and contributing positively to the learning process. Accordingly, some, many, most, or all poorly informed computed loss values may, at a minimum, complicate for the RNN to fit data (e.g., over-fit or under-fit), and, at a maximum, may make impossible for the RNN make to fit data at all. Therefore, this disclosure enables a software mechanism that provides a technique for computing those probability values and then applying those values to the learning process of the model for the RNN (or another ANN) in order to offset or ameliorate some negative impact of the signals that are sparse in the data sequence on the learning process of the model for the RNN (or another ANN).

An application of a probabilistic value for each of the data samples can include instructing the RNN (or another ANN) to regard various losses computed earlier in a sequence as less informative than those losses that are computed later in the sequence. Such a weighting scheme applied to the data series of FIG. 13 (sparse dataset) and can be illustrated as FIG. 14. The computed loss during the batch 1 should still be applied to enable learning, but the computed losses for the batch 2 should be regarded as more informative, and so forth. Note that for the data samples C, D, which represent counterexamples to the class that is being discriminated for, there can be a probability that the data samples C, D do not contain the signal (e.g., a feature of a part of a cat) at about 100%. For example, it is vacuously true that a data sample that does not contain a signal for that class as a whole does not contain a signal for any given window of data within that sample. Accordingly, a training technique for the RNN (or another ANN) that employs such a weighting scheme will be less impacted by false labels in the batches that are earlier and will learn at a much faster pace. Resultantly, in order to implement this weighting scheme, there should be enabled (1) an algorithm to compute these probabilities, and (2) a computing mechanism for applying these computed probabilities to the computed loss for these data samples.

The algorithm to compute these probabilities can be embodied in various ways. One of such ways includes a naïve algorithm (see other considerations below for algorithm constructions) where at least some probability values can take into account a total duration of a data sample, a cumulative amount of data in this data sample that has already been processed by the model of the RNN (or another ANN), and an average frequency of the signal per sample. This can be expressed as $P=I/N$, where P is a probability of having observed a signal, I is an index of a window of data, and N is a number of windows per sample. Given a sparse signal example illustrated in FIG. 15, various computed probabilities for each of the cells using this naive algorithm are illustrated in FIG. 16. As such, replacing these computed numeric probability values with circles of varying sizes yields a visualization of a rigorous methodology that matches an intuitive visualization illustrated in FIG. 14.

At this point, these probability values should be applied. Since the naïve algorithm has computed these probability values, these values are applied to the learning process of the RNN (or the ANN). This can be done in various ways. One of such ways involves employing sample weights associated with the data samples themselves. One application of sample weights is to correct class imbalance. In situations where observed data has a different class distribution than training data, if uncorrected, then the RNN, when trained, will have a natural bias against a deficient set. Therefore, sample weights can be used to create an artificial offset bias towards a deficient class (of the deficient set) proportional to a particular deficiency to correct the natural bias. Note that the sample weights can be input by the user (e.g., the client 106), where a default sample weight value can be 1. Sample weights can have other applications beyond fixing class imbalance. One example of this would be where specific instances of training data have a higher or lower impact than others. This would be where misclassifying a specific instance of data would have an outsized effect on overall performance, and may be reflected in the training data. At its simplest, sample weighting can include telling the model to increase or decrease an amount of loss produced by a given piece of example data.

Figure 17:
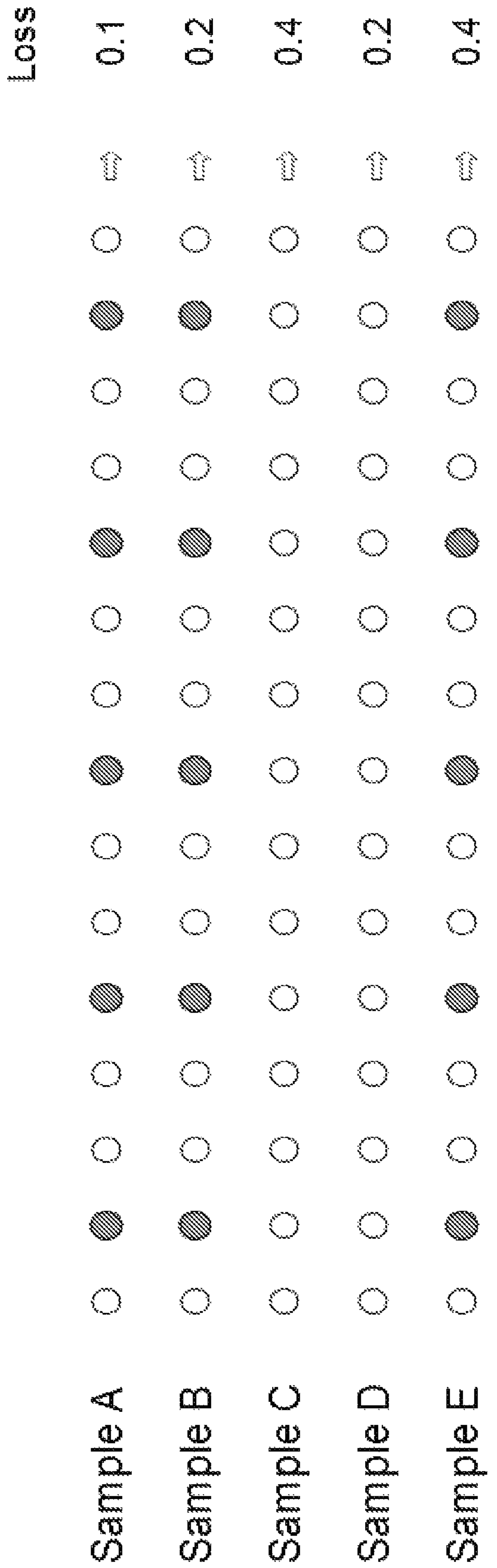

FIG. 17 depicts an illustration in which a value for loss which has been computed by a user-provided loss function is displayed after each row of data (data sample). Once a set of sample weights is factored, then final loss values can be illustrated. Note that for simplicity purposes a set of arbitrary sample weights is chosen. In practice, these are calculated weights whose algorithm is provided by the user. As illustrated in FIG. 18, the data samples A through E have weights of 1, 2, 0.5, 1, and 0 respectively. Therefore, the computed loss values are multiplied by the weights to determine with a set of final loss values, as illustrated in FIG. 18. Accordingly, sample weights are an effective mechanism (logic) for applying various probabilistic values that represent some likelihood that the RNN has observed signals in the cumulative data.

As disclosed herein, a reusable software library (e.g., source code, modules, files) can be programmed for an injection (input) into various publicly-available machine learning frameworks (e.g., at runtime, at initiation). The library can contain various computing functions (or other forms of logic) for computing at least some probabilistic values that may reflect a likelihood of having seen a signal and for applying those values to the sample weights, as disclosed herein. One of such frameworks is TensorFlow, which can be at least version 2. As such, this implementation in TensorFlow is disclosed herein. However, note that this implementation is illustrative and other machine learning frameworks, whether publicly-available or not, can be similarly used (e.g., PyTorch, Microsoft Cognitive Toolkit).

The library can be injected into a training process executed by TensorFlow (version 2). In order to override TensorFlow's built-in implementations of these training functions, there is a replacement of TensorFlow's model.fit function, which can enable taking in a data series (e.g., data samples) and running a gradient descent algorithm on a model of an ANN (e.g., RNN) using the data series.

While stateful RNNs can be trained using the model.fit function, some, many, most, or all implementations of various corresponding training algorithms instead opt for a finer control. Therefore, this disclosure enables a utilization of a model.train_on_batch function (although other suitable functions can be used). Rather than running a gradient descent on an entire dataset (e.g., data series), the model.train_on_batch function operates on a singular batch of data samples at a time. Among other advantages useful when architecting an RNN, this configuration enables a fine control of the sample weights. Although this disclosure is enabled to work with a basic model.fit functionality, such an approach would be technologically harder than using the model.train_on_batch function or would potentially interfere with other data optimizations that can be used.

The model.train_on_batch function, using the model of the ANN provided (e.g., instructed, selected, uploaded) by the user (e.g., the client 106) before training, runs a single gradient update on a single batch of data samples. For example, a gradient update can include a change to the sample weights of the model required to minimize at least some error for that training sample. Note that a magnitude of this change that will be applied to each of the sample weights is determined by computing a derivative of a cost function provided (e.g., instructed, selected, uploaded) by the user (e.g., the client 106) before training, with respect to each of the sample weights, whose magnitude can be tuned by a learning rate of the model of the ANN. The cost function or the learning rate should be provided (e.g., instructed, selected, uploaded) by the user (e.g., the client 106).

The library can make a call to the model.train_on_batch function. Before making that call, when the library is injected into the publicly-available machine learning framework (e.g., TensorFlow), the library can apply a probability transformation for each of the data samples to a value of an input parameter sample_weight of the publicly-available machine learning framework (e.g., TensorFlow). Note that as disclosed herein (other considerations section), the library can include other optimizations to combat various complications that may occur with this approach in certain situations. For example, this library can be programmed to be able to handle different distributions, signal occurrence frequencies, or additional weighting schemes.

As disclosed herein, in addition to technologically improving ANNs (e.g., more accurate model training when dealing with sparse signals in data series), various data science techniques for ameliorating negative impacts of signals that are sparse in data series for training of models in ANNs also have various other real world and practical applications. One example of a set of sparse data (e.g., data series) having a negative impact on a training process of an ANN (e.g., RNN) occurs in a discrimination between a normal electroencephalogram and an abnormal electroencephalogram, where some of such electroencephalograms can include up to a 72 hours of 200 samples (e.g., floating-point values, whole values) per second or Hertz (Hz) distributed across 19 geographically-related channels (although other electroencephalogram types are possible which can differ in time period or sampling or channel amount). For example, an electroencephalogram can be read by a medical doctor (e.g., a neurologist) in order to diagnose a neurological condition (e.g., epilepsy, seizure disorder) or a neurological impact (e.g., a neurological activity in a COVID patient). However, since human interpretation techniques can vary (e.g., training, experience, inexperience, cognitive fatigue, skimming, compression), there may be some negative impact to accuracy. Likewise, there may be some electroencephalograms that may have variable lengths (e.g. from about 20 minutes to full 72 hours). In these types of electroencephalograms, each of the data samples can have about 1 billion data points (or more or less). For example, there may be over 50 terabytes of such electroencephalogram data files, which can include over 1 million hours of human-labeled electroencephalogram recordings. Accordingly, a signal that determines that a given data sample should be classified as abnormal may occur in less than a single second or just a few hundred of those 1 billion data points. Without the library, the negative impact of the sparse signal within the data can be so great that learning is difficult for the ANN (e.g., inaccurate, imprecise, time consuming, memory intensive, computational cycle intensive) or sometimes plainly impossible for the ANN. Accordingly, the library ameliorates the negative impact of the sparse signal to allow the ANN to learn. For example, using the library, a computing machine (e.g., the server 104 or the client 106) can be programmed to complete an interpretation (e.g., classification, event detection, spike detection) of such electroencephalograms, with equivalent or higher level of accuracy as the medical doctor.

The interpretation can be supplemented via various computer vision algorithms interpreting a contemporaneous video of a patient from whom these electroencephalograms are contemporaneously obtained (e.g., electrical leads), whether those cameras are patient-worn or positioned near the patient (e.g., within a house of the patient). For example, such interpretation can include object detection, object tracking, and other object actions, while or after these electroencephalograms are being collected from the patient in real-time. For example, at least some of the object actions can include anomaly detection, seizure detection, which can occur in combination with electroencephalogram capture (e.g., via an electrical lead). However, note that other real world and practical applications include video processing, text processing, financial data, temperature monitoring, sensor monitoring, electrical load monitoring, or other uses of data inputs that have extraordinarily long sequences (e.g., a 19 channel, 72 hour EEG recording sampled at 200 Hertz (Hz), which is 984,960,000 (nearly 1 billion) data points) that require a lower dimensional input, while lacking knowledge of the location of the relevant signals (e.g., extremely long sequences lacking signal localization). For example, regression, multi-class, multi-label, or other ANN technological problems can be improved with some of these data science techniques. What the applications will have in common are extraordinarily long sequences that require a lower dimensional input, while lacking knowledge of the location of the relevant signals.

Circling back to the electroencephalograms, if the model was programmed to output an exact location of a seizure within a 72 hour examination file, then the data science techniques, as disclosed herein, can be used with other computing technologies to do so because the model would require examples of localized seizures in order to provide a localized output, which can be correspondingly supplemented by other computing technologies. However, if the model is programmed to provide an existence (or lack thereof) of a seizure (e.g., discriminatory classification), then the data science techniques, as disclosed herein, are helpful if an exact location of the seizure within the file is unknown. Note that these examples are illustrative and the data science techniques, as disclosed herein, can be combined with other methodologies (e.g., transfer learning). As such, the data science techniques, as disclosed herein, can be applicable when handling extremely long sequences, without knowledge of exact localities of relevant signals, and obtaining such information is unfeasible or insufficient.

Obtaining partial information as to signal locality can be useful to the various data science techniques, as disclosed herein, as such data science techniques can be used to inform various distributions of the signals, which can be combined with various techniques disclosed herein. For example, one of such combinations can be with the techniques disclosed below, which can sometimes be used to provide individualized distributions to improve performance.

Note that the data science techniques, as disclosed herein, may have other considerations, which are disclosed below. One of such considerations is stacking. In particular, the data science techniques, as disclosed herein, may be an additive to any sample weighting scheme (or lack thereof). Due to sample weights being multiplicative, any number of sample weighting schemes can be combined to combat different technological problems with training of an ANN (e.g., RNN). For example, there may be a 2 to 1 class imbalance between a target class and a counterexample class (e.g., for every 2 samples of the target class there is 1 sample of the counterexample class). As such, each of the counterexamples can be set to have a base sample weight of 2. Therefore, each counterexample data sample will contribute twice as much loss as each target data sample. This may lead to both classes being in balance with each other, and providing the same amount of loss in aggregate. Then, the data science techniques, as disclosed herein, can be applied to various subsamples of the target class. Supposing that there are 10 subsamples to a single data sample and the naive equation is used, then this may lead the first subsample having a weight of 0.1 for the target class and the first subsample for the counterexample class having either a weight of 2.0, or 0.2 to an alternative disclosed in a balancing consideration section.

| | 1 | 2 | 3 | 4 | 5 | 6 | 7 | 8 | 9 | 10 |
|---|---|---|---|---|---|---|---|---|---|---|
| Target | 0.1 | 0.2 | 0.3 | 0.4 | 0.5 | 0.6 | 0.7 | 0.8 | 0.9 | 1.0 |
| Counter | 2.0 | 2.0 | 2.0 | 2.0 | 2.0 | 2.0 | 2.0 | 2.0 | 2.0 | 2.0 |

Another situation where the data science techniques, as disclosed herein, could be combined with other weighting schemes is where given samples of 1 class can have different "importance" placed upon them. For example, there may be 2 samples, A of the target class and B of the target class. If there is a reason (e.g., business objectives) to have three times as important to correctly label sample B as sample A, then sample B can be assigned a sample weight of 3, and sample A can be assigned a sample weight of 1. When the data science techniques, as disclosed herein, are applied, then this weighting can be preserved. If there are 3 subsamples in a sample and the naive equation is used, then as illustrated below, for sample A, the first subsample would have a weight of 0.33, the second a weight of 0.66, and the third a weight of 1.0. For sample B, the first subsample would have a weight of 1.0, the second a weight of 2.0, and the third a weight of 3.0.

| | 1 | 2 | 3 |
|---|---|---|---|
| Sample A | 0.33 | 0.66 | 1.00 |
| Sample B | 1.00 | 2.00 | 3.00 |

Note that other weighting schemes can be combined with the data science techniques, as disclosed herein, by following similar basic principles, as disclosed herein. Generally, a weight given for any sample is multiplied by a weight produced by the data science techniques, as disclosed herein, in order to receive a final weight to be presented to a model of an ANN (e.g., RNN).

Another one of such considerations is balancing. Note that there is a possibility of a case that can give negative performance to various results of the data science techniques, as disclosed herein, and an alternative weighting scheme can be used to combat such negative performance. This alternative weighting scheme is referred to as "Balancing." In particular, the data science techniques, as disclosed herein, are useful for applying stateful RNNs to extremely long sequences. In explained above, there is a possibility of having over 1 billion discrete data points in a single sample of data. Supposing a subsequence length of 10,000 data points, this would lead to 100,000 discrete updates in a standard gradient descent optimizer for a single sample. For reference, this alone can be more than a number of discrete updates in many existing ANNs. Therefore, there may be a possibility to have extreme changes to various internals of an ANN (e.g., RNN) during this time. For example, as an artificial bias to a dataset is introduced, there is a possibility a model of the ANN can learn this bias. As such, during training time, there is a possibility of the ANN to artificially alter its internals in order to perform better based on this artificial bias. This bias could be seen by observing a significantly higher training accuracy than a test accuracy. This may occur because, while the ANN can update its internal structure during training time, the ANN is unable to do so for a test dataset. As such, the ANN would be unable to use this cheat to improve its performance, and a correspondingly lower accuracy would be seen.

This artificial bias may work based on various internal states of the ANN (e.g., RNN). As training starts, various counterexamples of the dataset will have a much higher weighting than the target examples. During an opening of a few updates, the model could learn to bias itself to discriminate out these examples by finding a random subset of internal states that correspond to these counterexamples, and increasing an amount the model listens to these states. During an early part of training, this would quickly lead to an artificially high accuracy, and artificially low loss. Then, as the target samples slowly begin to gain weight, the model could lower an amount that the model listens to these states to bring the model back to its baseline accuracy. This would lead to a higher overall reported accuracy, and a lower overall reported loss, all without any underlying changes to a final model when the sample finishes.

There is a way to combat this form of overfitting, still within the weighting scheme that is disclosed above. Simply, the user must also apply a same distribution of weighting percentages to the counterexamples, as the user does the data samples. For example, suppose that there are 2 samples A and B. Sample A is in a target set, and sample B is a counterexample. For simplicity, an assumption is made that both samples have 3 subsequences, and that the naive equation is used. In a base version, for Sample A, a first subsample will have a weight of 0.33, a second subsample will have a weight of 0.66, and a third subsample will have a weight of 1.0. For Sample B, a first subsample would have a weight of 1.0, a second subsample will have a weight of 1.0, and a third subsample a weight of 1.0, as illustrated below.

| | 1 | 2 | 3 |
|---|---|---|---|
| Sample A | 0.33 | 0.66 | 1.00 |
| Sample B | 1.00 | 1.00 | 1.00 |

As illustrated below, in order to apply this balancing alternative, Sample B may be modified such that the first subsample weight may be 0.33, the second subsample weight may be 0.66, and the last subsample weight may be 1.00.

| | 1 | 2 | 3 |
|---|---|---|---|
| Sample A | 0.33 | 0.66 | 1.00 |
| Sample B | 0.33 | 0.66 | 1.00 |

This alternative process can still be applied to any distribution of subsample counts, and can be combined with any other weighting schemes, just as was disclosed above.

Another one of such considerations is spanning. The naive equation assumes that for a given sample, there is a single occurrence of an actionable signal in an entire data sample. However, many real life datasets do not hold true for this assumption. One potential complication is that there might be only a single actionable signal across multiple samples. For example, suppose that there is a 72 hour EEG, as disclosed above. Furthermore, suppose that during that entire 72 hour, there is exactly one seizure. The user may know that this seizure is somewhere in those 72 hours of data, but not exactly where. The naive equation would work for this situation. But, suppose that during those 72 hours, we had a 2 hour interruption in a recording. For example, suppose that this interruption happened 10 hours into the recording. As such, there is now a 10 hour recording, and a 60 hour recording. For this example, there is an assumption of outside knowledge that the seizure didn't occur during the 2 hour interruption, i.e., the seizure still exists somewhere in the data, but we don't know if the seizure is in a first 10 hour recording, or in a second 60 hour recording.

| Segment 1 | Segment 2 |
|---|---|

The naive equation doesn't have a direct translation to this situation. However, there is a variant of various data science techniques, as disclosed herein, that can solve this technological problem. In particular, when there are multiple samples with only a single actionable signal across them, then the user can take into account the lengths of the samples and weigh them accordingly to allow the model to train better. This can be done by adjusting the sample weights of the subsamples to take into account the relative lengths of the samples, and keep them balanced.

Going back to the electroencephalogram example above, there are two samples, one with 10 hours, and another with 60 hours. Each subsample of these two samples may contain the same amount of time, and the same probability of containing the seizure. As such, applying the naive equation individually to the two samples may be improper (but possible). This would lead to the model thinking that each subsample of the 10 hour sample was six times as likely to contain the signal as each subsample of the 60 hour sample. Furthermore, if there are more samples in the same dataset that don't have this split, then there may be an assignment of twice as much weight to this singular signal compared to every other sample in the dataset. Instead, the respective lengths of the two samples for the purposes of the naïve equation are combined. As such, both the 10 hour sample and the 60 hour sample will both be treated as if they were 70 hours for the purpose of the naïve equation.

For example, supposing that there are two samples A1 and A2. The user may know that between the two samples, there is exactly one actionable signal. Sample A1 has 3 subsamples, Sample A2 has 7 subsamples. A combined length of Samples A1 and A2 is 10 subsamples. As such, for Sample A1, a first subsample will have a weight of 0.1, a second subsample will have a weight of 0.2, and a third subsample will have a weight of 0.3. For Sample A2, a first subsample will have a weight of 0.1, a second subsample will have a weight of 0.2, a third subsample will have a weight of 0.3, a fourth subsample will have a weight of 0.4, a fifth subsample will have a weight of 0.5, a sixth subsample will have a weight of 0.6, and a seventh subsample will have a weight of 0.7, as illustrated below.

| | 1 | 2 | 3 | 4 | 5 | 6 | 7 |
|---|---|---|---|---|---|---|---|
| Sample A1 | 0.1 | 0.2 | 0.3 | | | | |
| Sample A2 | 0.1 | 0.2 | 0.3 | 0.4 | 0.5 | 0.6 | 0.7 |

This process can be applied to any number of samples that contain a singular signal, with any combination of subsamples per sample by using variations of this process. This can also be applied to other distribution variants disclosed below by a similar transformation. The "Balancing" variant can also be applied to this variant, however for the counterexamples, each can be treated as an individual sample, even in cases like the EEG example where they came from the same original recording.

There may be other distributions of signals. The naive equation assumes that there is a single signal within the sample, and that the signal has an equal chance of occurring anywhere within the sample. However, this may not hold true for many real world applications. These alternative distributions require a change to the naïve equation to correctly inform the model as to the likelihood of the signal having transpired. For example, supposing a Sample A, with 3 subsamples. Within this sample, the user may know that exactly 2 of these subsamples contain actionable signals. In some situations, Sample A would have a weight of 0.33 for a first subsample, a weight of 0.66 for a second subsample, and a weight of 1.0 for a third subsample, as illustrated below.

| | 1 | 2 | 3 |
|---|---|---|---|
| Sample A | 0.33 | 0.66 | 1.00 |

However, the user may know for a fact that by a time that the second subsample has been processed, the model has seen an actionable signal. So, these weights can be used instead: a first subsample will have a weight of 0.5, a second subsample will have a weight of 1.0, and a third subsample will have a weight of 1.0. This better reflects the reality of the underlying data.

| | 1 | 2 | 3 |
|---|---|---|---|
| Sample A | 0.5 | 0.5 | 1.0 |

In addition to some samples potentially containing multiple actionable signals, the sample might have a different distribution of potential signals than purely uniform. For example, a Sample A may have 3 subsamples and assumption is made that a signal has a 50% chance to occur within a first subsample, a 10% chance to occur within a second subsample, and a 40% chance to occur within a third subsample. In this case, the user may want to adapt the weight distribution to better reflect these probabilities. As such, the first subsample will have a weight of 0.5, the second subsample will have a weight of 0.6, and the third subsample will have a weight of 1.0.

| | 1 | 2 | 3 |
|---|---|---|---|
| Sample A | 0.5 | 0.6 | 1.0 |

There are many possible different probability distributions, and number of samples per signal, and there is a correspondingly many number of potential variations needed to account for these scenarios. However, this basic process can be used to account for any distribution of signals and can be combined with any other variant, as disclosed herein, or any other possible weighting scheme.

Various data science techniques, as disclosed herein, can be used with various data science techniques to preserve signal in data inputs with moderate to high levels of variances in data sequence lengths for artificial neural network model training, as disclosed in U.S. Patent Application 63/027,269, which is incorporated by reference herein as if copied and pasted herein. These incorporated data science techniques can be helpful for dealing with time series or non-fixed-length time spans or other forms of discretized, parsed, or tokenized data. Some technological effects of utilizing these data science techniques can be technologically equivalent to getting more relevant training data, which can allow a model of a neural network (e.g., an RNN) to be trained to a high level of accuracy. Some of these data science techniques include a construction of a virtual batch, where at least some data samples are swapped in and out, and a technique of resetting a global state of a stateful RNN (or another ANN) that is sensitive to a state of the virtual batch in which only at least some state information relating to those swapped samples is reset in the virtual batch. For example, the technique for resetting the global state can reset various internal states relevant to new virtual data segments for various components of the stateful RNN (or another ANN).

Note that various data samples, as disclosed herein, can include alphanumerics, whole or decimal or positive or negative numbers, text or words, or other data types. These data samples can be sourced from a single data source or a plurality of data sources as time series or non-fixed-length time spans or other forms of discretized, parsed, or tokenized data. Some of such data sources can include electrodes, sensors, motors, actuators, circuits, valves, receivers, transmitters, transceivers, processors, servers, industrial equipment, electrical energy loads, IoT devices, microphones, cameras, radars, LiDARs, sonars, hydrophones, or other physical devices, whether positionally stationary (e.g., weather, indoor or outdoor climate, earthquake, traffic or transportation, fossil fuel or oil or gas) or positionally mobile, whether land-based, marine-based, aerial-based, or satellite-based. Some examples of such data sensors can include an EEG lead, although other human or mammalian bioinformatic sensors, whether worn or implanted (e.g., head, neck, torso, spine, arms, legs, feet, fingers, toes) can be included. Some examples of such human or mammalian bioinformatics sensors can be embodied with medical devices or wearables. Some examples of such medical devices or wearables include headgear, headsets, headbands, head-mounted displays, hats, skullcaps, garments, bandages, sleeves, vests, patches, footwear, or others. Some examples of various use cases involving such medical devices or wearables can include diagnosing, forecasting, preventing, or treating neurological conditions or disorders or events based on data samples from an EEG lead (or other bioinformatic sensors). Some examples of such neurological conditions or disorders or events include epilepsy, seizures, or others.

Note that the various data science techniques, as disclosed herein, can be used for exceptionally large datasets with extremely long time sequences, as disclosed herein. For example, some of these data science techniques can be employed on ANNs having at least 100,000 of trainable parameters or can operate on datasets with at least 10,000 of examples, where each of such examples can have at least 10,000 of time steps each. For example, there can be at least tens or hundreds of epochs to train. For example, there can be ANNs with millions of trainable parameters, datasets with millions of examples, and time series with millions of examples. For example, there can be batch sizes in hundreds to thousands, which allow some, many, most, or all computations of some of the various data science techniques to be performed in parallel.

In addition, features described with respect to certain example embodiments may be combined in or with various other example embodiments in any permutational or combinatorial manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although various embodiments have been depicted and described in detail herein, skilled artisans know that various modifications, additions, substitutions and the like can be made without departing from this disclosure. As such, these modifications, additions, substitutions and the like are considered to be within this disclosure.

The invention claimed is:

1. A method for ameliorating negative impacts of signals that are sparse in various data series for trainings of artificial neural network models, the method comprising:

accessing, by a processor, a window size, a loss function, a plurality of sample weights, and a data series, wherein the loss function has a first value and a second value, wherein the data series contains a plurality of data samples containing a plurality of signals, wherein the signals are sparse within the data samples;

segmenting, by the processor, the data samples into a plurality of batches according to the window size;

for each of the batches:

causing, by the processor, a model of an artificial neural network (ANN) to output a prediction value based on the first value given a window of data based on the second value, wherein the window data corresponding to the window size;

inputting, by the processor, the window of data and the prediction value into the loss function such that the loss function outputs a plurality of computed loss values for each of the data samples for a respective window of data when the ANN has a first state including a set of weights;

determining, by the processor, a probability value for each of the data samples within a respective batch while accounting a total duration of a respective data sample, a cumulative amount of data in the respective sample that has already been processed by the model, and an average frequency of a respective signal per the respective data sample, wherein the probability value reflects a probability that the model has observed a signal for a respective data sample at a respective window position within the data series, wherein the probability value increases as more windows of data for the respective data sample are processed by the model;

generating, by the processor, a plurality of new sample weights based on applying the probability values to the sample weights for the respective batch;

generating, by the processor, a new set of computed loss values based on the computed loss values and the new sample weights;

applying, by the processor, the new set of computed loss values to the set of weights such the set of weights is changed from the first state into a second state; and causing, by the processor, the ANN to be programmed for generating a prediction that is more accurate at the second state than the first state.

2. The method of claim 1, wherein the probability value is determined based on P=I/N.

3. The method of claim 1, wherein the new set of computed loss values is generated based on the computed loss values and the new sample weights being multiplied.

4. The method of claim 1, wherein the data samples are different from each other in a sequence length.

5. The method of claim 1, wherein the ANN is a stateful ANN.

6. The method of claim 5, wherein the stateful ANN is a stateful recurrent neural network (RNN).

7. The method of claim 5, wherein the stateful ANN is a stateful long short-term memory (LSTM).

8. The method of claim 5, wherein the stateful ANN is a stateful convolutional neural network (CNN).

9. The method of claim 1, further comprising:
overriding, by the processor, a default behavior of a machine learning framework such that the model of the ANN is trained based on the second state.

10. The method of claim 1, wherein the data samples are sourced from a plurality of electrical leads.

11. A system for ameliorating negative impacts of signals that are sparse in various data series for trainings of artificial neural network models, the system comprising:
a server programmed to:
access a window size, a loss function, a plurality of sample weights, and a data series, wherein the loss function has a first value and a second value, wherein the data series contains a plurality of data samples containing a plurality of signals, wherein the signals are sparse within the data samples;
segment the data samples into a plurality of batches according to the window size;
for each of the batches:
cause a model of an artificial neural network (ANN) to output a prediction value based on the first value given a window of data based on the second value, wherein the window data corresponding to the window size;
input the window of data and the prediction value into the loss function such that the loss function outputs a plurality of computed loss values for each of the data samples for a respective window of data when the ANN has a first state including a set of weights;
determine a probability value for each of the data samples within a respective batch while accounting a total duration of a respective data sample, a cumulative amount of data in the respective sample that has already been processed by the model, and an average frequency of a respective signal per the respective data sample, wherein the probability value reflects a probability that the model has observed a signal for a respective data sample at a respective window position within the data series, wherein the probability value increases as more windows of data for the respective data sample are processed by the model;
generate a plurality of new sample weights based on applying the probability values to the sample weights for the respective batch;
generate a new set of computed loss values based on the computed loss values and the new sample weights;
apply the new set of computed loss values to the set of weights such the set of weights is changed from the first state into a second state; and
cause the ANN to be programmed for generating a prediction that is more accurate at the second state than the first state.

12. The system of claim 11, wherein the probability value is determined based on P=I/N.

13. The system of claim 11, wherein the new set of computed loss values is generated based on the computed loss values and the new sample weights being multiplied.

14. The system of claim 11, wherein the data samples different from each other in a sequence length.

15. The system of claim 11, wherein the ANN is a stateful ANN.

16. The system of claim 15, wherein the stateful ANN is a stateful recurrent neural network (RNN).

17. The system of claim 15, wherein the stateful ANN is a stateful long short-term memory (LSTM).

18. The system of claim 15, wherein the stateful ANN is a stateful convolutional neural network (CNN).

19. The system of claim 11, wherein the server is further programmed to:
override a default behavior of a machine learning framework such that the model of the ANN is trained based on the second state.

20. The system of claim 11, wherein the data samples are sourced from a plurality of electrical leads.

* * * * *